June 23, 1959  F. L. G. BETTRIDGE  2,891,362
METHOD OF ENCASING ELECTRICAL CAPACITORS
Filed Sept. 2, 1952

INVENTOR
Frederick L. G. Bettridge
By: Watson, Cole, Grindle
and Watson
ATTORNEYS United States Patent Office 2,891,362
Patented June 23, 1959

2,891,362

METHOD OF ENCASING ELECTRICAL CAPACITORS

Frederick Leonard George Bettridge, Wandsworth, London, England, assignor to A. H. Hunt (Capacitors) Limited, London, England, a British company Application September 2, 1952, Serial No. 307,523

Claims priority, application Great Britain August 11, 1952

5 Claims. (Cl. 53—37)

This invention comprises improvements in or relating to electrical capacitors.

The invention relates to capacitors of the type in which the parts are enclosed in a metal tubular case with the terminals projecting at one or both ends and the case is sealed by an insulating material which fills the space at the end around the terminals.

According to the present invention a resin of the type known as an epoxy resin, or an unsaturated polyester resin or polystyrene or the like is applied in liquid form as the sealing material, and is caused to set while retained in place by a portion of the case itself, the case being so shaped as to allow the sealing material to grip firmly on the case and thus provide a seal against the ingress of water or water vapour.

It has been shown that thermoplastic or thermosetting resins may be made to give a good seal on a metal can provided they are arranged so that the solid mass of resin surrounds the periphery of the can both internally and externally. The resin will have a higher coefficient of thermal expansion than the metal of which the can is constructed, and it will be seen that at any temperature at which the capacitor is required to operate the resin seal will be exerting pressure against the periphery of the can, either internally or externally according to temperature.

According to the present invention the capacitor case itself is so constructed as to hold the resin in the desired position while it is setting so that when set the resin is surrounding the periphery of the can or a projection therefrom, both internally and externally.

The accompanying drawing shows by way of example certain constructions in accordance with the invention, and in the drawing.

Figure 1:
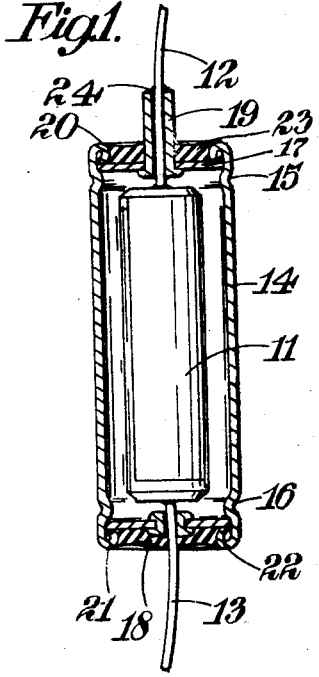
Figure 1 is a longitudinal section through one construction.

Referring to Figure 1, the capacitor proper 11 is made by winding dielectric and electrode strip material into a roll and securing terminal wires 12, 13 in known manner, one at each end. This assembly is introduced into a case 14 consisting of an aluminum tube open at both ends, but having grooves 15, 16 spun in it, round its circumference, one near each end. When the capacitor 11 is in the case 14 insulating discs 17, 18 are threaded, one over each terminal wire, and rest inside the corresponding end of the case, against one of the internal ribs formed by the spun grooves 15, 16.

The disc 17 carries a long tubular eyelet 19 which projects beyond the end of the aluminum tube, and through this tube passes the terminal wire 12. The other disc 18 carries a small eyelet of normal shape through which the second terminal wire 13 passes and to which the wire is soldered. The ends of the case are then spun over inwards as shown at 20, 21 so as to overlie but not to touch the insulating discs.

A small quantity of liquid "Araldite" (a trade name for one brand of epoxy resin) is poured into one end of the capacitor until it fills the space above the disc up to the level of the end of the can (covering the inturned edge of the can) and is allowed to set as shown at 22. The capacitor is then inverted and similarly sealed with "Araldite" 23. These sealing operations can in practice be performed in batches of a number of capacitors at one time, held in a frame.

The tube 19 which passes through the seal 23 at one end remains open and is used to impregnate the capacitor with insulating oil under first vacuum and then pressure. Finally the tube 19 is sealed to the terminal wire which it surrounds by solder 24. The result is a capacitor sealed in a manner which withstands great extremes of heat and cold and is of neat appearance.

Figure 2:
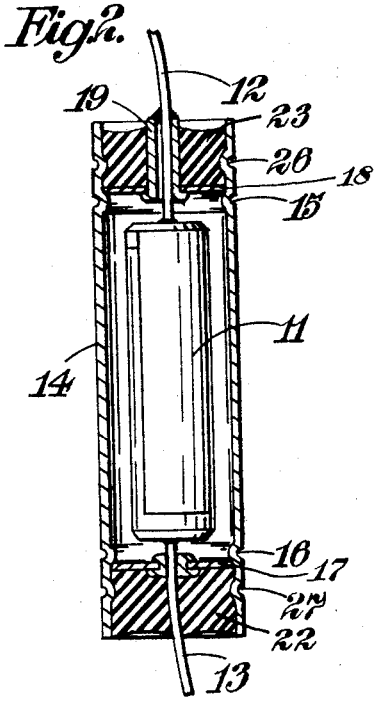
Figure 2 is a similar view of a second form.
Figure 3:
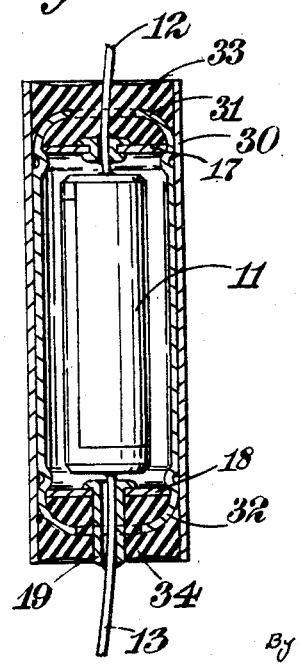
Figure 3 is a similar view of a third form.

In the form shown in Figure 2 and generally of similar construction, like parts being numbered similarly to Figure 1, instead of spinning-in the ends of the tubular case, a second groove or rill, 26 at one end and 27 at the other, is provided nearer to the end of the tube than the groove 15 already described which supports the insulating disc, on to which the sealing material may contract and provide the pressure necessary to ensure a perfect seal.

In a third form shown in Fiugre 3 there is a second plain tube 30 telescoped over the grooved one 14 and projecting beyond the end thereof to receive the "Araldite." The grooved inner case supports the insulating discs as before, and is spun in at the ends as shown at 31, 32. The "Araldite" 33, 34 is in this case able to overflow the spun-in ends of the inner tube and is held in place by the outer tube, so that after the "Araldite" has set it completely encloses the edges of the inner tube. The tubes need not either of them be quite so thick as the single tube employed in the first and second forms of this invention.

While a wound condenser has been referred to, it will be understood other forms can be used for example mica stacks or ceramic bodies and the tubular case, while intended to be circular in the forms shown in the drawing, may be of oval or rectangular section if desired.

I claim:

1. A process for making a casing-terminal seal structure comprising the steps of introducing the electrical element to be protected by the seal into a metal case having at least one inwardly directed circumferential groove spun thereon near the open end thereof, threading at least one insulating disc over the terminal wire on the said element so as to rest against the interior projection formed by said groove within the casing, spinning the open end of the case inwards, telescoping a second case over the first and allowing it to project beyond at least one end thereof, pouring a liquid synthetic resin into the cup formed by the projection of the said second case, thus filling the space within the second case above the insulating disc, on both sides of the inturned end of the first case, with the resin, and allowing the resin to set insitu within the second case so causing the inturned end of the first case to be embedded in the resin.

2. A process as claimed in claim 1 wherein the liquid synthetic resin is selected from the group consisting of epoxy resins, polyester resins and polystyrene.

3. A process as claimed in claim 1 wherein both the first and second cases are cylindrical tubes open at both ends, and wherein the second tube is longer than the first so as to project beyond both ends of the first tube, both ends of said first case being inturned.

4. A process of sealing an electrical capacitor housed in an open-ended metal can, and having a terminal connection passing to the exterior of the can through said open end and out of contact therewith, comprising the steps of impressing an inwardly-projecting groove or beading around the can near the open end, placing in the open end to rest on said beading an insulating washer having an aperture through which the terminal connection can pass, forming a second inward projection around the can by turning in the rim of the open end of the can, placing a tube in telescopic manner around the can, said tube being dimensioned so as to project beyond the open end of the can to act as a confining mould, and while the can is held with said open end uppermost filling the space in the can end around the terminal connection and outside the washer with a synthetic resin sealing medium selected from the group consisting of epoxy resins, polyester resins and polystyrene, which resin sealing medium is in liquid form during the sealing so as to flow into place in the said confining mold and without pressure, the liquid resin being retained from flowing down through the can while it is setting by the washer beneath, and enough resin is used to solidify into a sealing plug which has the said turned in rim embedded in it.

5. A process for making a casing terminal seal structure comprising the steps of introducing the electrical element to be protected by the seal and an annular insulating member into a first metal case, which case has at least one inwardly directed circumferential groove spun thereon near the end thereof to support said annular insulating member to prevent ingress of liquid between the element and the case, spinning the open end of said first case inward, telescoping a second case over the first and allowing it to project beyond at least one end thereof, pouring a liquid synthetic resin into the cup formed by the projection of the second case, thus filling the space within the second case above the said annular insulating member on both sides of the turned in end of the first case with the resin, and allowing the resin to set in situ within the second case so causing the turned in ends of the first case to be embedded in the resin.

References Cited in the file of this patent

UNITED STATES PATENTS

| | | |
|---|---|---|
| 1,315,365 | Hamm | Sept. 9, 1919 |
| 1,850,105 | Higginbottom | Mar. 22, 1932 |
| 2,029,430 | Kopinski | Feb. 4, 1936 |
| 2,282,398 | Ehrlich | May 12, 1942 |
| 2,444,880 | Robinson | July 6, 1948 |
| 2,549,770 | Burnham | Apr. 24, 1951 |
| 2,611,793 | Simpson | Sept. 23, 1952 |

FOREIGN PATENTS

| | | |
|---|---|---|
| 478,582 | Great Britain | Jan. 20, 1938 |
| 611,719 | Great Britain | Nov. 3, 1948 |

OTHER REFERENCES

Preiswerk: "Ethoxylines," Modern Plastics, November 1950, pp. 85–88.